US012571250B2

(12) United States Patent
Liang et al.

(10) Patent No.: US 12,571,250 B2
(45) Date of Patent: Mar. 10, 2026

(54) METHOD AND STRUCTURE FOR FORMING A HONEYCOMB CURTAIN

(71) Applicant: CHING FENG HOME FASHIONS CO., LTD., Changhua County (TW)

(72) Inventors: Wen Ying Liang, Changhua County (TW); Sheng Ying Hsu, Changhua County (TW); Chien Chih Huang, Changhua County (TW); Wu Chung Nien, Changhua County (TW); Ming Chu Chiang, Changhua County (TW); Wei Ming Shih, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 95 days.

(21) Appl. No.: 18/521,266

(22) Filed: Nov. 28, 2023

(65) Prior Publication Data

US 2024/0337150 A1 Oct. 10, 2024

(51) Int. Cl.
*E06B 9/262* (2006.01)
*D03D 1/00* (2006.01)
*D03D 3/02* (2006.01)
*D03D 9/00* (2006.01)

(52) U.S. Cl.
CPC ........... *E06B 9/262* (2013.01); *D03D 1/0017* (2013.01); *D03D 3/02* (2013.01); *D03D 9/00* (2013.01); *E06B 2009/2627* (2013.01)

(58) Field of Classification Search
CPC ........................................................ E06B 9/292
USPC ........................................................ 160/84.05
See application file for complete search history.

(56) References Cited

U.S. PATENT DOCUMENTS 4,676,855 A * 6/1987 Anderson .......... B29D 99/0089 156/193
5,043,039 A * 8/1991 Swiszcz ............... B31D 3/0215 428/116
5,188,160 A * 2/1993 Jelic ........................ E06B 9/262 160/84.05
5,205,333 A * 4/1993 Judkins ................... E06B 9/266 428/116

(Continued)

FOREIGN PATENT DOCUMENTS

KR 102027383 B1 * 10/2019 ............. E06B 9/262

*Primary Examiner* — Kristina R Fulton

(74) *Attorney, Agent, or Firm* — Che-Yang Chen; Law Office of Michael Chen

(57) ABSTRACT

A method for forming a honeycomb curtain and includes a weaving process, a fixing process, a gluing process, a stacking process and a cutting process. The honeycomb curtain includes multiple netted tubes, and each netted tube includes an upper portion and a lower portion. The central portion of each of the upper and lower portions is woven to form a tight-woven structure. Two sides of each of the central portions are woven to form a sparse-woven structure to form the upper portion to be a breathable first semi-transparent strip and to form the lower portion to be a second semi-transparent strip. The outer corner of each of the upper and lower portions are woven to form another tight-woven structure. The central portions of each of the netted tubes are applied with glue on respective outer face thereof. The netted tubes are stacked and pressed to form a layered structure.

5 Claims, 11 Drawing Sheets

(56) References Cited

U.S. PATENT DOCUMENTS

| | | | | | |
|---|---|---|---|---|---|
| 5,339,882 | A * | 8/1994 | Judkins | E06B 9/262 | 160/84.05 |
| 5,562,967 | A * | 10/1996 | Kikuchi | D03D 9/00 | 428/196 |
| 5,620,035 | A * | 4/1997 | Judkins | E06B 9/262 | 160/84.05 |
| 5,654,073 | A * | 8/1997 | Swiszcz | D06M 15/263 | 428/116 |
| 5,691,031 | A * | 11/1997 | Swiszcz | D06M 23/16 | 428/218 |
| 5,746,266 | A * | 5/1998 | Colson | B29C 53/36 | 428/116 |
| 6,103,336 | A * | 8/2000 | Swiszcz | B31D 3/0207 | 428/116 |
| 6,302,982 | B1 * | 10/2001 | Corey | B29C 66/8242 | 156/193 |
| 6,767,615 | B1 * | 7/2004 | Judkins | E06B 9/262 | 428/116 |
| 6,989,066 | B2 * | 1/2006 | Yu | B32B 3/12 | 156/196 |
| 8,568,859 | B2 * | 10/2013 | Yu | B32B 7/05 | 428/116 |
| 8,596,327 | B2 * | 12/2013 | Rupel | E06B 9/262 | 160/84.05 |
| 8,967,224 | B2 * | 3/2015 | Foley | E06B 9/262 | 160/84.01 |
| 2002/0043346 | A1 * | 4/2002 | Zorbas | E06B 9/262 | 160/84.05 |
| 2004/0079493 | A1 * | 4/2004 | Yu | B32B 3/12 | 160/84.05 |
| 2005/0236094 | A1 * | 10/2005 | Yu | E06B 9/266 | 156/182 |
| 2007/0039697 | A1 * | 2/2007 | Sun | E06B 9/262 | 160/84.05 |
| 2013/0180671 | A1 * | 7/2013 | Deitz | C08L 51/06 | 160/84.05 |
| 2015/0184450 | A1 * | 7/2015 | Rupel | E06B 9/262 | 160/84.05 |
| 2021/0054545 | A1 * | 2/2021 | Okuno | A61F 2/06 | |
| 2024/0337150 | A1 * | 10/2024 | Liang | D03D 1/0017 | |
| 2025/0109631 | A1 * | 4/2025 | Chiu | B29C 66/437 | |

* cited by examiner

METHOD AND STRUCTURE FOR FORMING A HONEYCOMB CURTAIN

FIELD OF THE INVENTION

The present invention relates to a honeycomb curtain manufacturing equipment, and more particularly, to a method and structure for forming a honeycomb curtain.

BACKGROUND OF THE INVENTION

The manufacturing process of a conventional honeycomb window curtain is as follows:

As shown in FIGS. 7 and 8, divide the netted strip 6 into two sides, including a first processing strip 4 and a second processing strip 5. Place a release paper 8 in the center of the netted strip 6, and then fold the first processing strip 4 and the second processing strip 5 on both sides of the netted strip 6 towards the center.

Apply adhesive to the bonding area 7 of the netted strip 6, and use a stacking device to sequentially stack and bond multiple layers of the netted strips 6.

Use a cutting device to cut a section of the stacked netted strip 6 to a desired length, then remove the release paper 8 from the netted strip 6, forming a semi-finished netted curtain body 9.

The aforementioned release paper 8 is used to prevent the adhesive from seeping into other layers of the lattice processing strip 6 during the bonding process, which could cause the lattice processing strip 6 to stick together and not expand properly.

The drawbacks of the above manufacturing method include:

Because during the bonding process of the netted strip 6, the release paper 8 needs to be inserted to prevent adhesive from penetrating into other layers, the removal of release paper 8 after the production of the semi-finished netted curtain body 9. During the bonding process, the layers of the netted strips 6 need to be maintained their relative positions. This makes the manufacturing process quite complex and challenging, resulting in a significant increase in manufacturing costs.

The manufacturing process of the semi-finished netted curtain body 9 is too complex and cannot be produced using existing honeycomb curtain processing machinery, leading to higher manufacturing costs and, consequently, higher product prices.

The present invention intends to provide a method and structure for forming a honeycomb curtain so as to eliminate the drawbacks mentioned above.

SUMMARY OF THE INVENTION

The present invention relates to a method for forming a honeycomb curtain and comprises:

- a weaving process: using a weaving machine to complete weaving of a netted tube, the netted tube being a symmetrical open shape when unfolded and including an upper portion and a lower portion, a central portion of each of the upper portion and the lower portion of the netted tube being woven with a twisted yarn to form a tight-woven structure, two sides of each of the central portions being woven to form a sparse-woven structure so as to form the upper portion to be a breathable first semi-transparent strip and to form the lower portion to be a second semi-transparent strip, an outer corner that is located away from the first and second semi-transparent strips is woven to form another tight-woven structure;
- a fixing process: using a pressure heating device to press and flatten the netted tube, the central portions of the netted tube being aligned with each other to form a symmetrical netted tube;
- a gluing process: applying adhesive to the central portions of the netted tube;
- a stacking process: using a stacking and pressing device, the netted tubes with adhesive applied being stacked in a manner with an adhesive side facing outward, forming a layered structure, and
- a cutting process: cutting the layered netted tubes to a desired length to form a honeycomb curtain.

Preferably, the central portions of the first and second semi-transparent strips are made of tightly woven twisted yarn.

Preferably, the sides of the first and second semi-transparent strips are made of sparsely woven single yarn.

Preferably, the outer corner of the first and second semi-transparent strips is made of tightly woven single yarn.

The present invention also provides a honeycomb curtain that comprises multiple netted tubes, and each netted tube includes an upper portion and a lower portion when unfolded. A central portion of each of the upper portion and the lower portion of the netted tube is woven to form a tight-woven structure. Two sides of each of the central portions are woven to form a sparse-woven structure so as to form the upper portion to be a breathable first semi-transparent strip, and to form the lower portion to be a second semi-transparent strip. The outer corner, away from the first and second semi-transparent strips, is woven to form another tight-woven structure. The central portions of each of the netted tubes are applied with glue on respective outer face thereof. The netted tubes are stacked and pressed to form a layered structure.

The structure of the honeycomb curtain made by the above-described method is characterized by the central portions of the upper and lower portions of the netted tubes form a tightly woven structure. The honeycomb curtain structure is woven with varying densities, allowing light to pass through the curtain and thereby adjusting indoor brightness.

Due to the method provided in the present invention, there is no need for a spreading device or the insertion of release paper during the manufacturing process. As a result, the side profile and colors can be more varied, significantly expanding the application possibilities of the honeycomb curtain made by the present invention.

The primary object of the present invention is to provide a method for forming a honeycomb curtain, which can improve the complexity associated with conventional honeycomb curtain manufacturing and can be produced in large quantities.

Another objective of this invention is to provide a honeycomb curtain structure wherein each netted tube includes an upper portion and a lower portion which is glued to the upper portion of another netted tube to exhibit good stretch ability and structural strength.

The present invention will become more obvious from the following description when taken in connection with the accompanying drawings which show, for purposes of illustration only, a preferred embodiment in accordance with the present invention.

Attachment 1: An actual product image of the netted tube of the present invention.

Attachment 2: An enlarged image of the central portion of the Attachment 1.

Attachment 3: An actual product image of the honeycomb curtain of the present invention.

DETAILED DESCRIPTION OF THE PREFERRED EMBODIMENT

Figure 1:
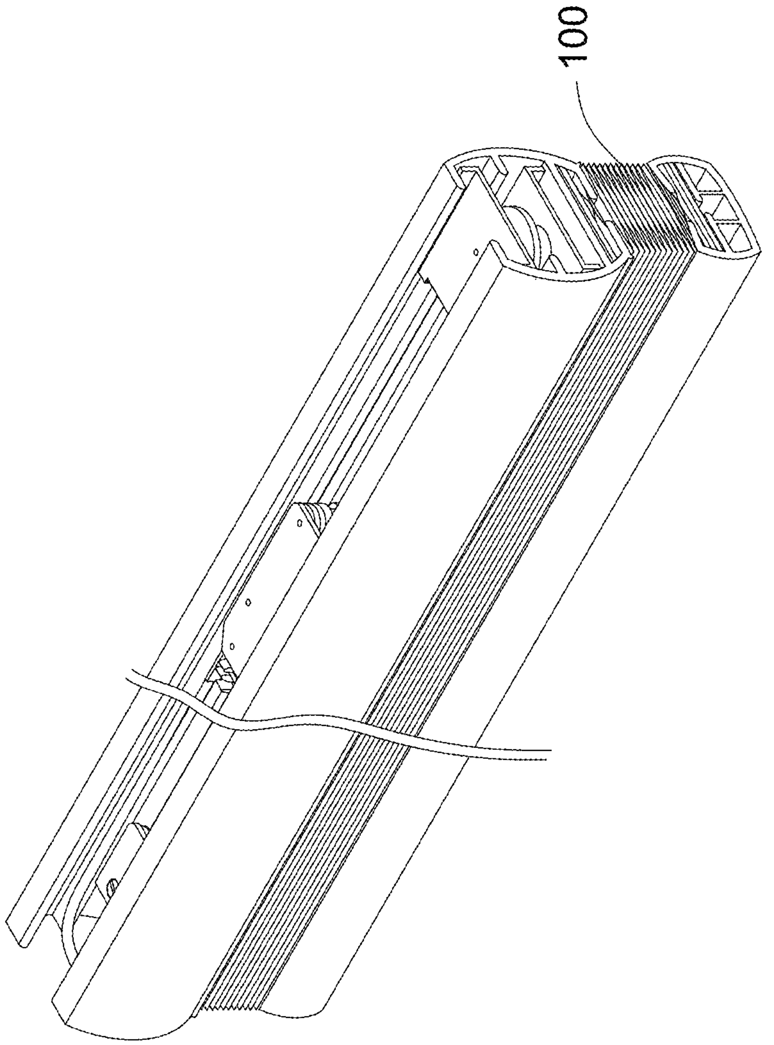
FIG. 1 shows a perspective view of the honeycomb curtain of the present invention used to a widow curtain assembly.
Figure 2:
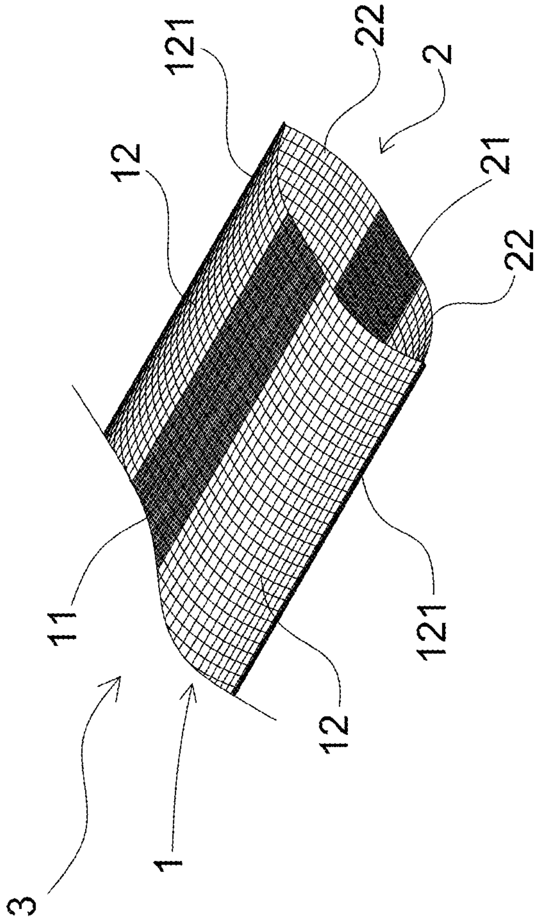
FIG. 2 shows a section of the netted tube of the honeycomb curtain of the present invention.
Figure 3:
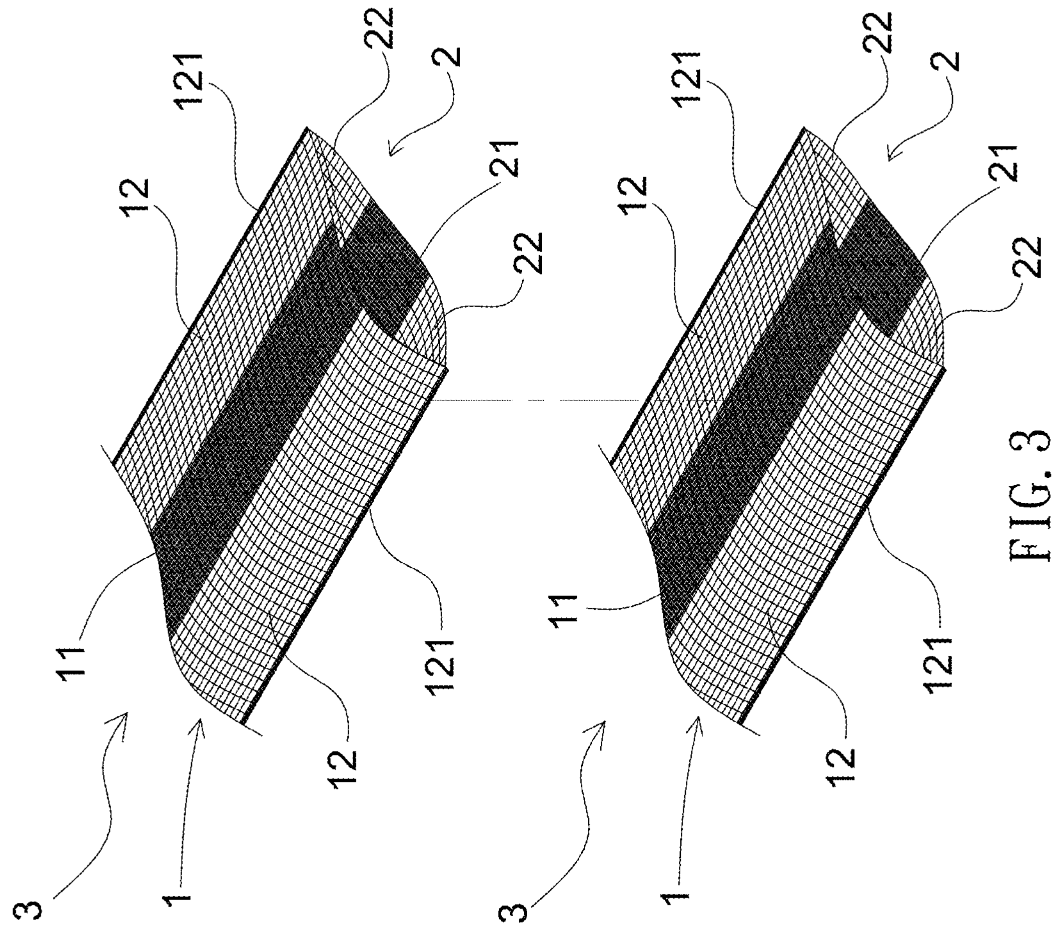
FIG. 3 shows the gluing process of the present invention.
Figure 4:
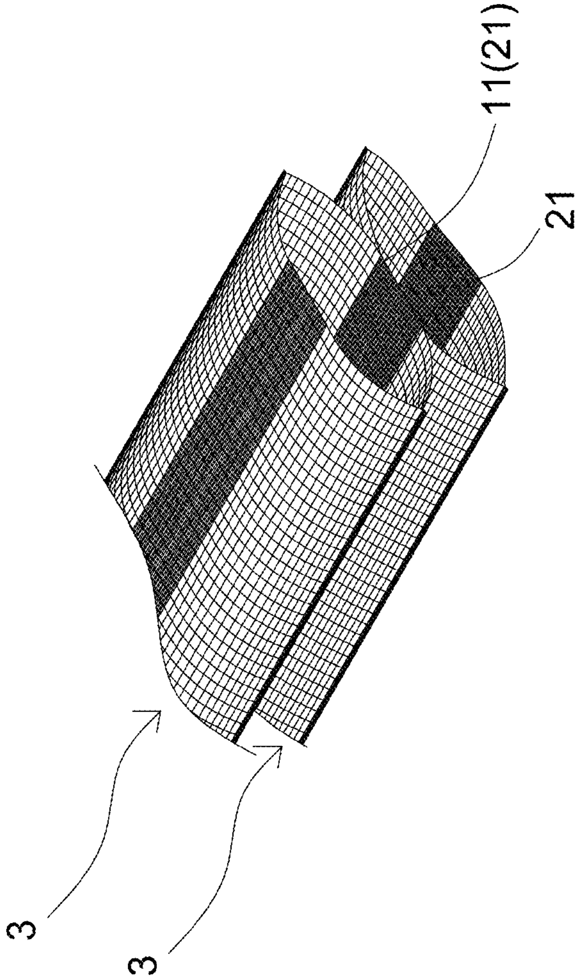
FIG. 4 shows the assembly of the netted tubes of the honeycomb curtain of the invention.
Figure 5:
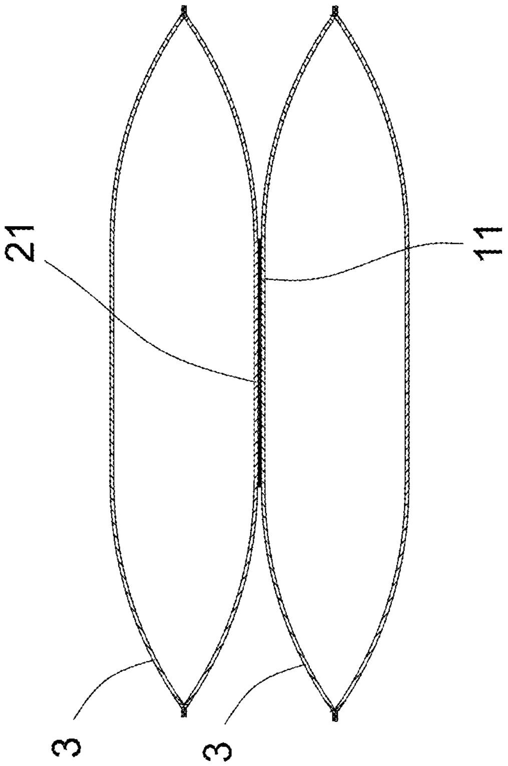
FIG. 5 is an end view of FIG. 4.
Figure 6:
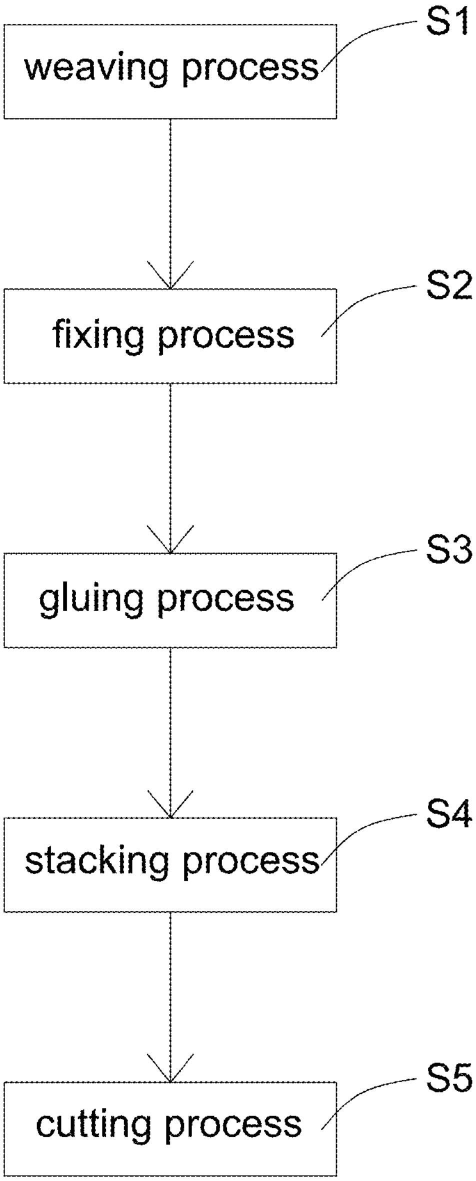
FIG. 6 illustrates a flowchart depicting the processes of the present invention.
Figure 7:
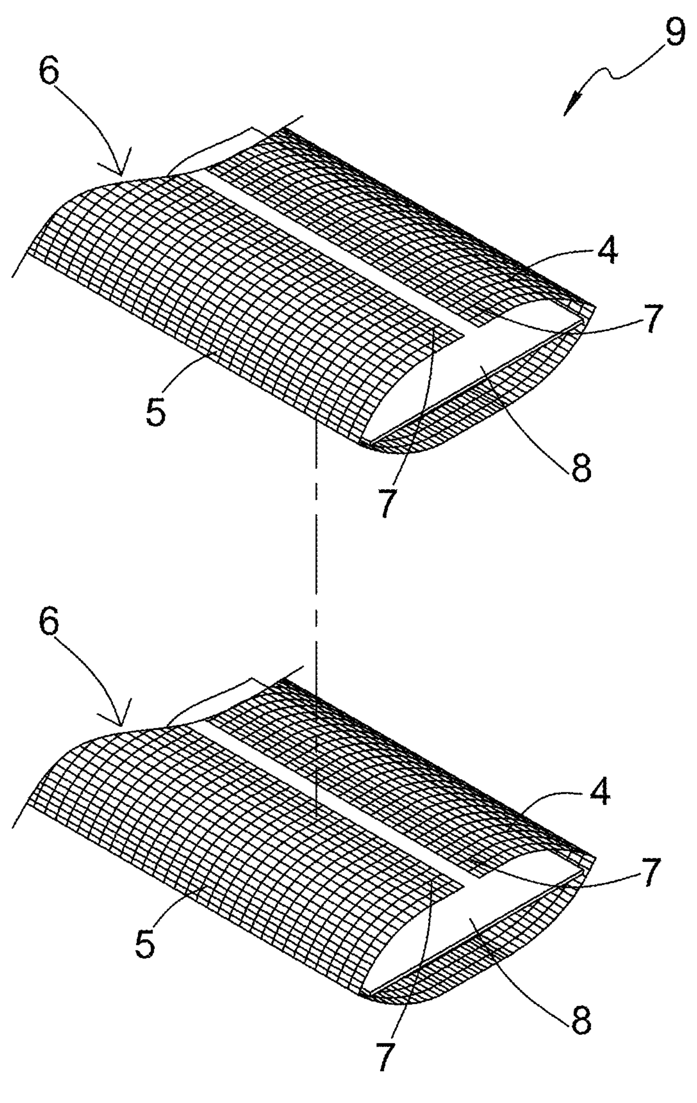
FIG. 7 Prior Art
FIG. 7 is an exploded view to show a conventional honeycomb curtain.
Figure 8:
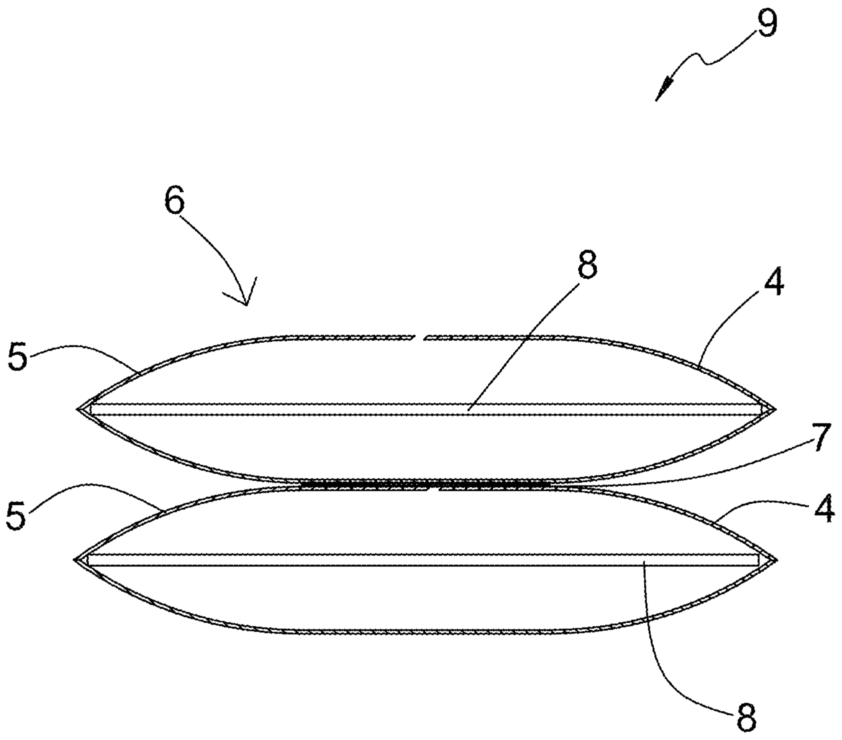
FIG. 8 Prior Art
FIG. 8 is an end view of FIG. 7.
Figure 9:
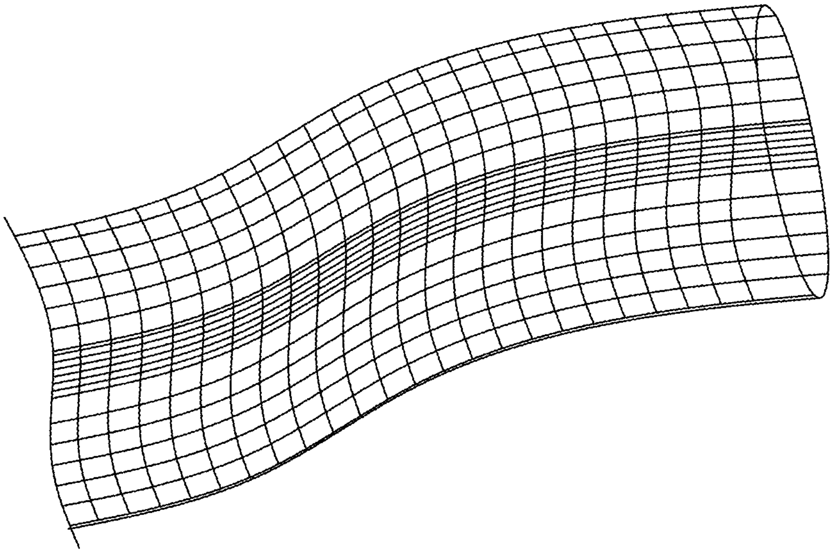
Figure 10:
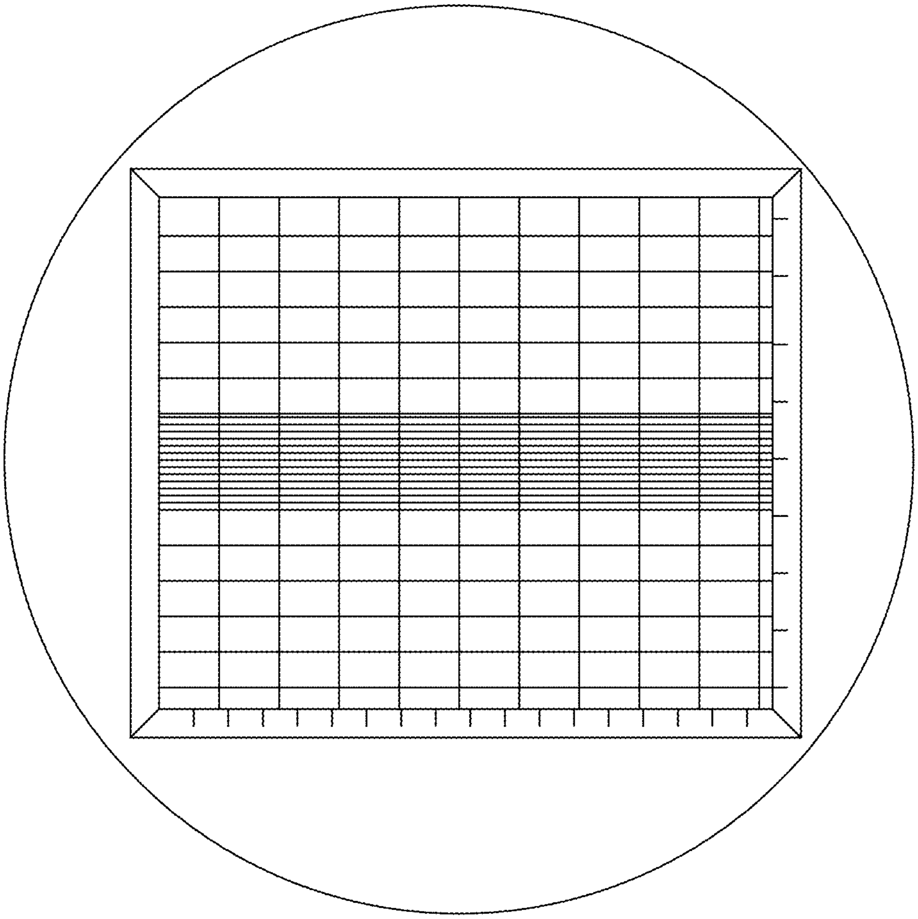
Figure 11:
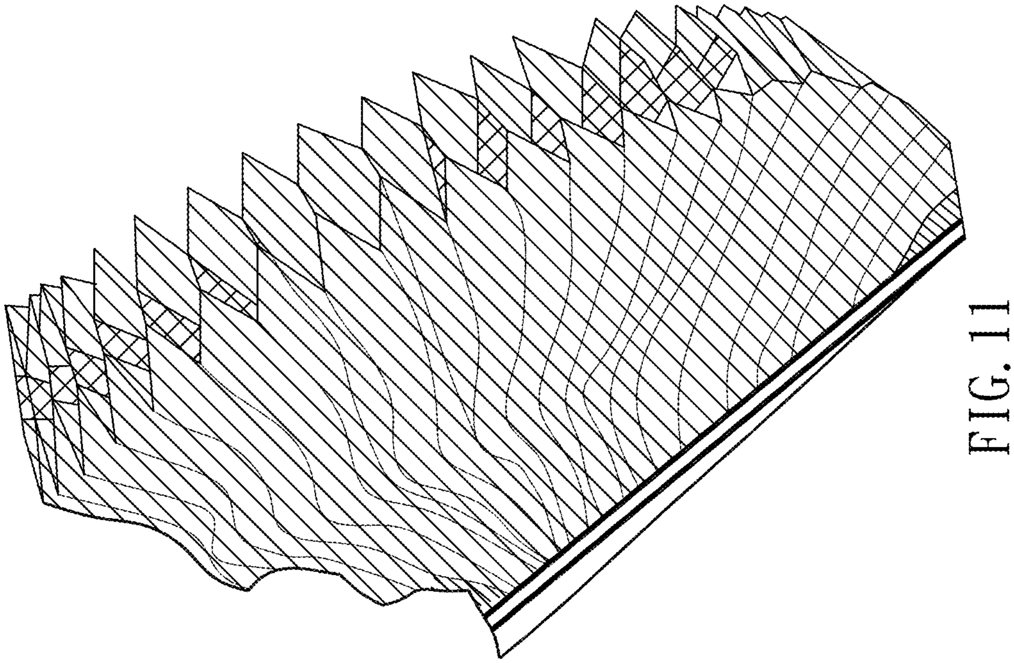

Referring to FIGS. 1 to 6, the method for forming a honeycomb curtain of the present invention comprises:

- a weaving process S1: using a weaving machine to complete weaving of a netted tube 3, the netted tube 3 being a symmetrical open shape when unfolded and including an upper portion and a lower portion, a central portion 11/21 of each of the upper portion and the lower portion of the netted tube 3 being woven with a twisted yarn to form a tight-woven structure, two sides 12 and 22 of each of the central portions 11 and 21 being woven to form a sparse-woven structure so as to form the upper portion to be a breathable first semi-transparent strip 1 and to form the lower portion to be a second semi-transparent strip 2, an outer corner 121, away from the first and second semi-transparent strips 1, 2, being woven to form another tight-woven structure;
- a fixing process S2: using a pressure heating device (not shown) to press and flatten the netted tube 3 as shown in FIGS. 2, 5 and 9, the central portions 11 and 21 of the netted tube 3 being aligned with each other to form a symmetrical netted tube 3;
- a gluing process S3: applying adhesive to the central portions 11 and 21 of the netted tube 3 as shown in FIGS. 4 to 6;
- a stacking process S4: using a stacking and pressing device, the netted tubes 3 with adhesive applied being stacked in a manner with an adhesive side facing outward, forming a layered structure as shown in FIG. 6 and 11, and
- a cutting process S5: cutting the layered netted tubes 3 to a desired length to form a honeycomb curtain 100 as shown in FIGS. 1 and 4.

As shown in FIGS. 1 to 6, and FIGS. 9 and 10, the central portions 11 and 12 of the first and second semi-transparent strips 1, 2 are made of tightly woven twisted yarn. The sides 12 and 22 of the first and second semi-transparent strips 1, 2 are made of sparsely woven single yarn. The outer corner 121 of the first and second semi-transparent strips 1, 2 is made of tightly woven single yarn.

It is noted that the stacking process S4 and the cutting process S5 are also used in the conventional method, so that the method of the present invention can be used in the equipment for the conventional honeycomb curtain.

As shown in FIG. 1 and FIG. 11, the honeycomb curtain made by the method of the present invention comprises multiple netted tubes 3, and each netted tube 3 includes an upper portion and a lower portion when unfolded as shown in FIG. 2. A central portion 11/21 of each of the upper portion and the lower portion of the netted tube 3 is woven to form a tight-woven structure. Two sides 12 and 22 of each of the central portions 11 and 21 are woven to form a sparse-woven structure so as to form the upper portion to be a breathable first semi-transparent strip 1, and to form the lower portion to be a second semi-transparent strip 2. An outer corner 121, away from the first and second semi-transparent strips 1, 2, is woven to form another tight-woven structure. The central portions 11 and 21 of each of the netted tubes 3 are applied with glue on respective outer face thereof, and the netted tubes 3 are then stacked and pressed to form a layered structure.

The structure of the honeycomb curtain made by the above-described method is characterized by the central portions of the upper and lower portions of the netted tubes form a tightly woven structure. The honeycomb curtain structure is woven with varying densities, allowing light to pass through the curtain and thereby adjusting indoor brightness.

Due to the denser structure of the central portions 11 and 21 of the first semi-transparent strip 1 and the second semi-transparent strip 2, during the gluing process, the adhesive will not leak into the voids. Therefore, continuous production is possible, leading to reduced manufacturing costs and increased production output.

With the manufacturing method of this invention, there is no need for a spreading device or the insertion of release paper during the manufacturing process. Consequently, the side profile and colors can be more varied, significantly expanding the application possibilities of the lattice honeycomb blind curtain body produced by this invention.

While we have shown and described the embodiment in accordance with the present invention, it should be clear to those skilled in the art that further embodiments may be made without departing from the scope of the present invention.

What is claimed is:

1. A method for forming a honeycomb curtain comprising:

- a weaving process: using a weaving machine to complete weaving of a netted tube, the netted tube being a symmetrical open shape when unfolded and including an upper portion and a lower portion, a central portion of each of the upper portion and the lower portion of the netted tube being woven with a twisted yarn to form a first woven structure, two sides of each of the central portions being woven with single yarn to form a second woven structure so as to form the upper portion to be a breathable first semi-transparent strip and to form the lower portion to be a second semi-transparent strip, an outer corner, away from the first and second semi-transparent strips, being woven with single yarn to form a third woven structure;
- a fixing process: using a pressure heating device to press and flatten the netted tube, the central portions of the netted tube being aligned with each other to form a symmetrical netted tube;

a gluing process: applying adhesive to the central portions of the netted tube;

a stacking process: using a stacking and pressing device, the netted tubes with adhesive applied being stacked in a manner with an adhesive side facing outward, forming a layered structure; and a cutting process: cutting the layered netted tubes to a desired length to form a honeycomb curtain.

2. The method as claimed in claim 1, wherein the central portions of the first and second semi-transparent strips are made of twisted yarn in the first woven structure.

3. The method as claimed in claim 1, wherein the sides of the first and second semi-transparent strips are made of single yarn in the second woven structure.

4. The method as claimed in claim 1, wherein the outer corner of the first and second semi-transparent strips is made of single yarn in the third woven structure.

5. A honeycomb curtain comprising:

multiple netted tubes, each netted tube including an upper portion and a lower portion when unfolded, a central portion of each of the upper portion and the lower portion of the netted tube being woven to form a first woven structure, two sides of each of the central portions being woven with single yarn to form a second woven structure so as to form the upper portion to be a breathable first semi-transparent strip and to form the lower portion to be a second semi-transparent strip, an outer corner, away from the first and second semi-transparent strips, being woven with single yarn to form a third woven structure, the central portions of each of the netted tubes being applied with glue on respective outer face thereof, the netted tubes being stacked and pressed to form a layered structure.

* * * * *